United States Patent
Alameh et al.

(10) Patent No.: US 8,553,397 B2
(45) Date of Patent: Oct. 8, 2013

(54) METHOD AND APPARATUS FOR COUPLING PORTABLE COMMUNICATION DEVICES

(75) Inventors: Rachid Alameh, Crystal Lake, IL (US); William Hede, Lake in the Hills, IL (US); Paul Steuer, Hawthorn Woods, IL (US)

(73) Assignee: Motorola Mobility LLC, Libertyville, IL (US)

( * ) Notice: Subject to any disclaimer, the term of this patent is extended or adjusted under 35 U.S.C. 154(b) by 228 days.

(21) Appl. No.: 13/098,446

(22) Filed: Apr. 30, 2011

(65) Prior Publication Data

US 2012/0275089 A1    Nov. 1, 2012

(51) Int. Cl.
H05K 5/00    (2006.01)
H05K 7/00    (2006.01)

(52) U.S. Cl.
USPC .................................... 361/679.01

(58) Field of Classification Search
None
See application file for complete search history.

(56) References Cited

U.S. PATENT DOCUMENTS

| | | | |
|---|---|---|---|
| 5,177,784 A | 1/1993 | Hu et al. | |
| 5,796,822 A | 8/1998 | Larson et al. | |
| D430,153 S | 8/2000 | Hino | |
| D430,559 S | 9/2000 | Hino | |
| 6,256,193 B1* | 7/2001 | Janik et al. | 361/679.59 |
| 6,567,677 B1* | 5/2003 | Sokoloff | 455/575.1 |
| 6,728,557 B1* | 4/2004 | Tracy et al. | 455/575.3 |
| 6,758,303 B2 | 7/2004 | Zurek et al. | |
| 7,027,797 B2 | 4/2006 | Mori | |
| 7,098,897 B2 | 8/2006 | Vakil | |
| 7,151,912 B1 | 12/2006 | Morrison | |
| 7,215,538 B1* | 5/2007 | Chen et al. | 361/679.06 |
| 7,330,178 B2 | 2/2008 | Yorio | |
| 7,351,065 B1 | 4/2008 | Merrell et al. | |
| 7,374,425 B1* | 5/2008 | Kuo et al. | 439/31 |
| 7,512,429 B2* | 3/2009 | Chan | 455/575.3 |
| 7,539,526 B2* | 5/2009 | Pirila et al. | 455/575.3 |
| 7,580,726 B2* | 8/2009 | Maatta et al. | 455/550.1 |
| 8,046,037 B2* | 10/2011 | Jang | 455/575.4 |
| 2005/0026658 A1 | 2/2005 | Soejima | 455/575.1 |
| 2008/0132302 A1* | 6/2008 | Schechtel et al. | 455/575.4 |
| 2008/0146273 A1* | 6/2008 | Otani et al. | 455/556.1 |
| 2008/0186663 A1* | 8/2008 | Chen | 361/681 |
| 2009/0005131 A1* | 1/2009 | Gitzinger et al. | 455/575.3 |
| 2009/0258675 A1* | 10/2009 | Okuda | 455/556.1 |
| 2010/0188806 A1 | 7/2010 | Mulford | |

FOREIGN PATENT DOCUMENTS

GB    2364613 A    1/2002
JP    4153297 B2   9/2008

OTHER PUBLICATIONS

BrassBinnacle.com: Nickel Plated Brass Magnifying Glass on Stand; http://www.brassbinnacle.com/Merchant2/merchant.mvc?Screen . . . Jul. 14, 2010 (Copyright 2002-2010 BrassBinnacle.com).

* cited by examiner

Primary Examiner — Hoa C Nguyen
Assistant Examiner — Xanthia C Cunningham

(57) ABSTRACT

A method and apparatus mechanically couple portable communication devices. The apparatus can include a first shaft having a first shaft longitudinal axis, a first shaft length along the first shaft longitudinal axis, a first shaft end, and a second shaft end. The apparatus can include a first portable communication device having a first housing coupled to the first shaft end where the first housing rotates about an axis perpendicular to the first shaft longitudinal axis, the first housing having a first housing width. The apparatus can include a second portable communication device that can have a second portable communication device communication signal interface configured to communicate with a first portable communication device communication signal interface and can have a second housing that rotates about an axis perpendicular to the first shaft longitudinal axis. The first shaft length can be at least as long as the first housing width.

23 Claims, 17 Drawing Sheets

METHOD AND APPARATUS FOR COUPLING PORTABLE COMMUNICATION DEVICES

BACKGROUND

1. Field

The present disclosure is directed to a method and apparatus for mechanically coupling portable communication devices. More particularly, the present disclosure is directed to a detachable coupling mechanism that provides fully configurable portable communication device form factors.

2. Introduction

Portable communication devices used in today's society include mobile phones, personal digital assistants, laptop computers, tablets, gaming devices, and various other electronic communication devices. Current portable communication devices are crammed with many features, such as phone features, gaming features, navigation features, music playing features, electronic messaging features, camera features, video features, application features, and many other features.

Portable communication devices today have fixed form factors. For example, mobile phones have a fixed form factor, such as a flip phone form factor, a slider phone form factor, a candy bar phone form factor, a touch-screen phone form factor, or other fixed form factors.

Unfortunately, these form factors are too rigid in that they have very limited flexibility to be reconfigured to other form factors. This limited flexibility is due to the complexity of portable communication device hinges. For example, a phone with a flip form factor cannot be converted into a slider form factor. Furthermore, portable communication device hinges use hinge stops that break if excessive force is applied to the hinge. For example, a flip phone hinge will break if excessive force is applied to the phone halves when the flip phone is open. Additionally, a phone's original form factor cannot be significantly altered, which prevents optimal configuration of the phone for many of its features. For example, an open flip form factor can be better for projecting an image on a wall from a phone microprojector and a side-by-side form factor can be better for displaying one image on two combined phone screens. These limitations are the result of limited coupling devices for portable communication devices.

Thus, there is a need for a method and apparatus for mechanically coupling portable communication devices.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus for mechanically coupling portable communication devices is disclosed. The apparatus can include a first shaft having a first shaft longitudinal axis, a first shaft length along the first shaft longitudinal axis, a first shaft end at first end along the first shaft longitudinal axis, and a second shaft end at a second end along the first shaft longitudinal axis. The second shaft end can be opposite the first shaft end. The apparatus can include a first portable communication device having a first housing coupled to the first shaft end where the first housing rotates about an axis perpendicular to the first shaft longitudinal axis, the first housing having a first housing length perpendicular to the first shaft longitudinal axis, a first housing width perpendicular to the first housing length. The apparatus can include a second portable communication device that can include a second portable communication device communication signal interface configured to communicate with a first portable communication device communication signal interface and can include a second housing that rotates about an axis perpendicular to the first shaft longitudinal axis. The first shaft length can be at least as long as the first housing width.

Figure 1:
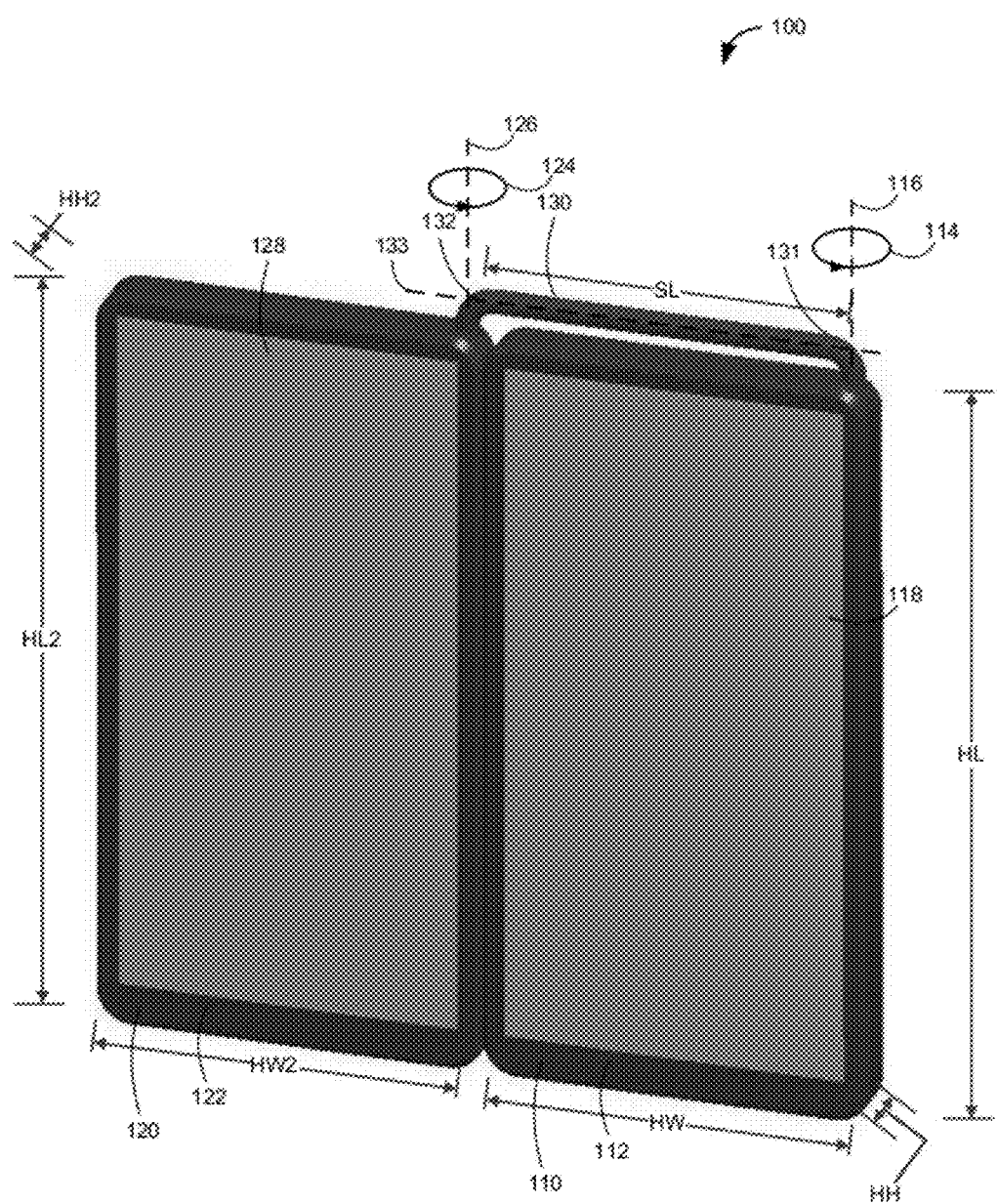
FIG. 1 is an example illustration of an apparatus in one orientation according to one embodiment.
Figure 2:
FIG. 2 is an example illustration of the apparatus in FIG. 1 in a second orientation according to one embodiment.

FIG. 1 is an example illustration of an apparatus 100 in one orientation according to one embodiment. FIG. 2 is an example illustration of the apparatus 100 in FIG. 1 in a second orientation according to one embodiment. The apparatus 100 can include a first shaft 130 having a first shaft longitudinal axis 133, a first shaft length SL along the first shaft longitudinal axis 133, a first shaft end 131 at a first end along the first shaft longitudinal axis 133, and a second shaft end 132 at a second end along the first shaft longitudinal axis 133, the second shaft end 132 opposite the first shaft end 131. The apparatus 100 can include a first portable communication device 110. The first portable communication device 110 can include a first portable communication device communication signal interface (not shown). The first portable communication device 110 can include a first housing 112 coupled to the first shaft end 131 where the first housing 112 can rotate about an axis 114 perpendicular to the first shaft longitudinal axis 133. The first housing 112 can have a first housing length HL perpendicular to the first shaft longitudinal axis 133, a first housing width HW perpendicular to the first housing length HL, and a first housing height HH perpendicular to the first housing width HW and the first housing length HL. The first housing width HW can be greater than the first housing height HH. The first shaft length SL can be at least as long as the first housing width HW.

The apparatus 100 can include a second portable communication device 120. The second portable communication device 120 can include a second portable communication device communication signal interface (not shown) configured to communicate with the first portable communication device communication signal interface. The second portable communication device 120 can include a second housing 122 coupled to the second shaft end 132. The second housing 122 can rotate 124 about an axis 126 perpendicular to the first shaft longitudinal axis 133.

The first shaft 130 can be curved and can still include a longitudinal axis 133 parallel with a line between a point where the first housing 110 couples to the first shaft end 131 and a point where the second housing 120 couples to the second shaft end 132. The housing lengths HL and/or HL2 may be greater than or equal to the housing widths HW and/or HW2 or may be less than or equal to the housing widths HW and/or HW2.

The first portable communication device 110 and/or the second portable communication device 120 can be a device including cellular or wireless communication circuitry, such as Bluetooth, Wi-Fi, or GPS. For example, the first portable communication device 110 can be a mobile phone, a personal digital assistant, or any other communication device that is intended to be carried by a user while allowing the user to communicate or perform applications using the portable communication device 110. As a further example, the portable communication device 110 can be a wireless communication device, such as a navigation device, a gaming device, an entertainment device, a wireless telephone, a cellular telephone, a personal digital assistant, a pager, a selective call receiver, or any other device that is capable of sending and receiving communication signals on an electronic network. Also, the first portable communication device 110 can include a first display 118 and the second portable communication device 120 can include a second display 128.

The first housing 112 can rotate 114 with respect to the first shaft 130 about an axis 116 parallel with the first housing length HL. The second housing 122 can have a second housing length HL2 that is substantially equal to the first housing length HL. For example, the second portable communication device housing 122 can have second housing length HL2 perpendicular to the first shaft longitudinal axis SL, a second housing width HW2 perpendicular to the second housing length HL2, and a second housing height HH2 perpendicular to the second housing width HW2 and the second housing length HL2. The second housing width HW2 can be greater than the second housing height HH2. The first shaft length SL can be at least as long as the second housing width HW2.

The first housing 112 can be detachably coupled to the first shaft end 131 such that the first housing 112 is intended to be separated from the first shaft end 131. The second housing 122 can also be detachably coupled to the second shaft end 132. Also, the first portable communication device 110 can be adapted to be used independent from the second portable communication device 120. For example, the first portable communication device 110 can include its own processor, battery, user interface, and other components for autonomous operation.

The first housing 112 can be configured to infinitely rotate 114 about the axis 116 perpendicular to the first shaft longitudinal axis 133. The first shaft 130, the first housing 112, and the second housing 122, when connected together, can operate to provide at least two of: a side-by-side display for the two housings, an elevated display of one housing with respect to the other housing, a back-to-back setting with displays opposite from each other, a front-to-front setting with displays facing each other, more than two cascaded displays for more than two housings, angled displays facing away from each other for each housing, a front-to-front setting with displays facing each other for each housing with at least one display partially exposed, or other form factors.

Figure 3:
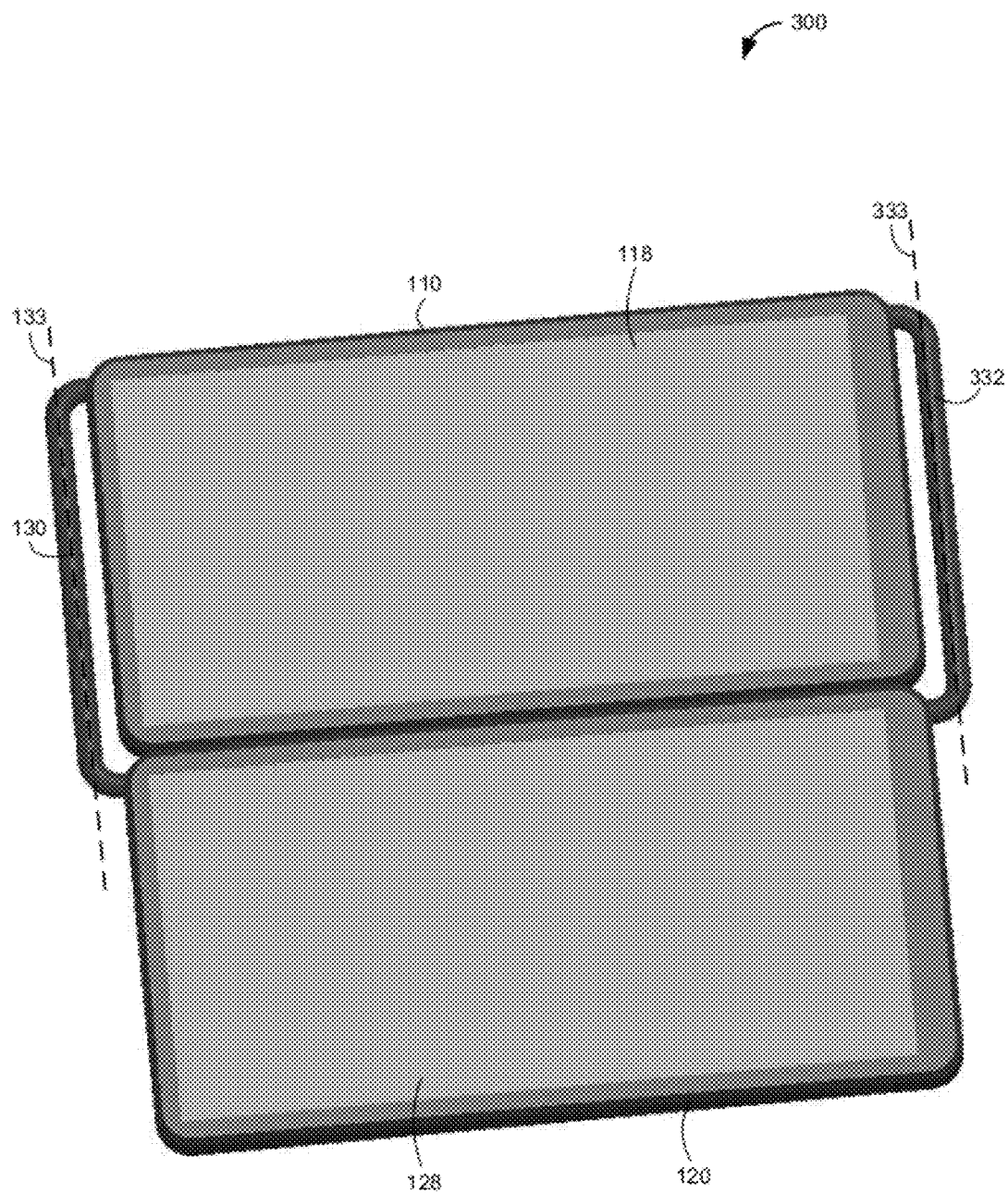
FIG. 3 is an example illustration of an apparatus according to one embodiment.

FIG. 3 is an example illustration of an apparatus 300 according to one embodiment. The apparatus 300 can include elements of the apparatus 100. For example, the apparatus 300 can include the first shaft 130 having the first shaft longitudinal axis 133. The apparatus 300 can include the first portable communication device 110. The first portable communication device 110 can be coupled to the first shaft 130. The apparatus 300 can include the second portable communication device 120. The second portable communication device 120 can be coupled to the first shaft 131. The first portable communication device 110 can include a first display 118 and the second portable communication device 120 can include a second display 128.

The apparatus can include a second shaft 332 having a second shaft longitudinal axis 333 substantially parallel to the first shaft longitudinal axis 133. The second shaft 332 can be coupled to the first housing and coupled to the second housing. The second shaft 332 can include all of the features of the first shaft 130.

Figure 4:
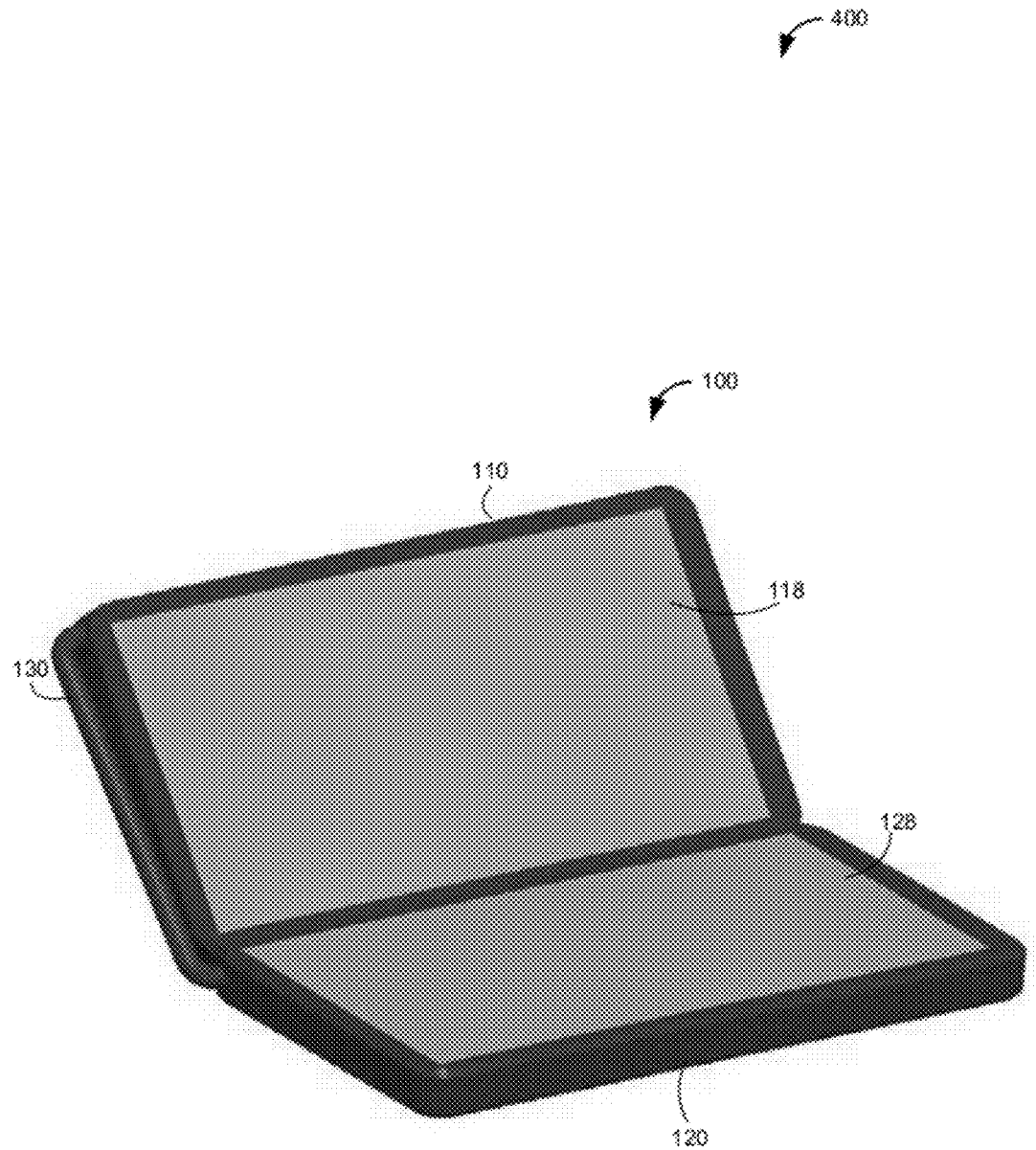
FIG. 4 is an example illustration of the apparatus in FIG. 1 in a third orientation according to one embodiment.

FIG. 4 is an example illustration of the apparatus 100 in FIG. 1 in a third orientation 400 according to one embodiment. The apparatus 100 can include the first shaft 130, the first portable communication device 110, and the second portable communication device 120. The first portable communication device 110 can include a first display 118 and the second portable communication device 120 can include a second display 128. The third orientation 400 can provide a clam television viewing mode, can provide an office phone, can provide for work phone settings, and can provide for work files, apps, and/or contacts settings for the apparatus 100.

Figure 5:
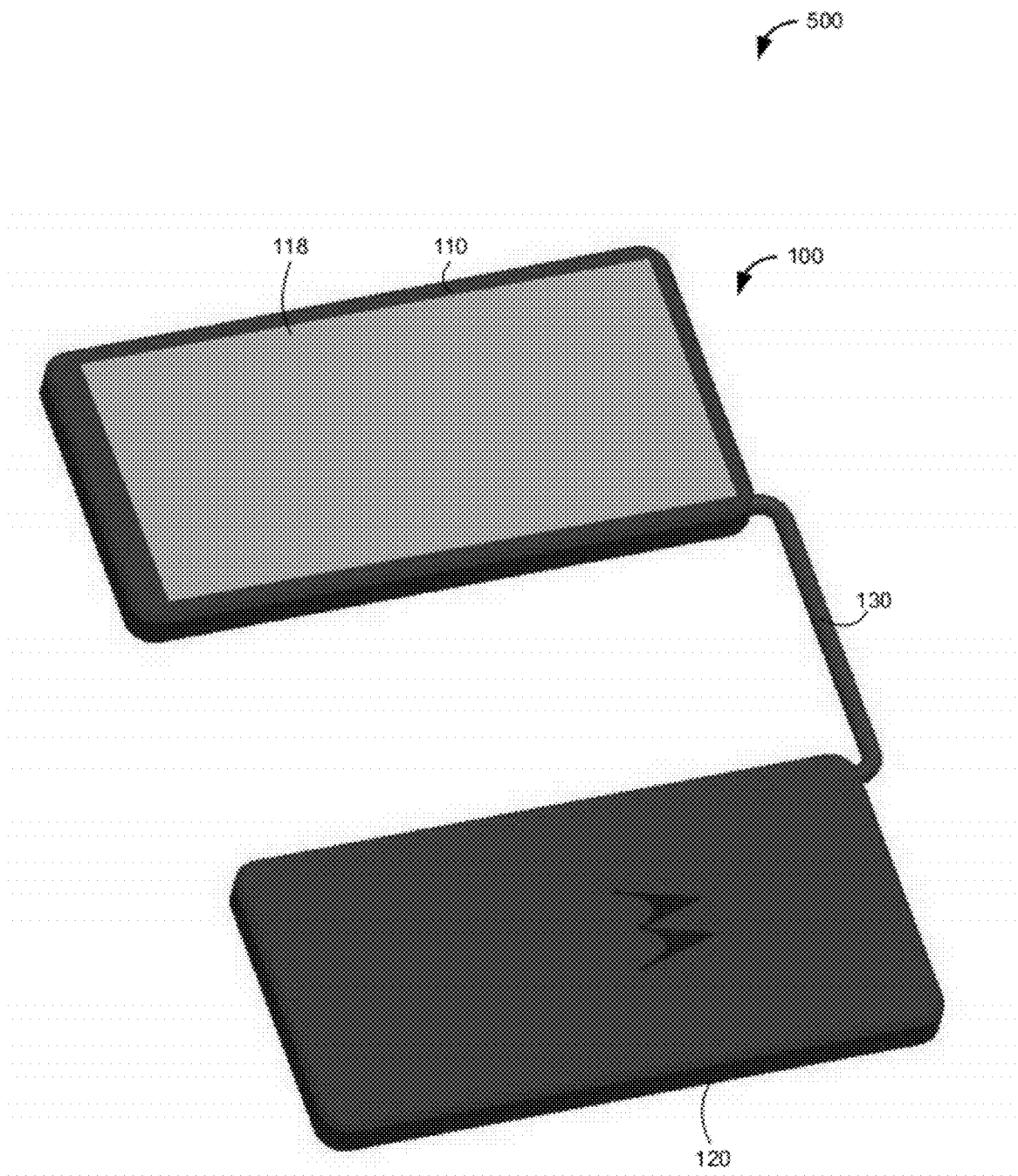
FIG. 5 is an example illustration of the apparatus in FIG. 1 in a fourth orientation according to one embodiment.

FIG. 5 is an example illustration of the apparatus 100 in FIG. 1 in a fourth orientation 500 according to one embodiment. The apparatus 100 can include the first shaft 130, the first portable communication device 110, and the second portable communication device 120. The first portable communication device 110 can include a first display 118 and the second portable communication device 120 can include a second display (not shown). The fourth third orientation 500 can provide an elevated clam mode for the apparatus 100 that provides a high television mode where the first portable communication device 110 can be elevated above a surface by the shaft 130.

Figure 6:
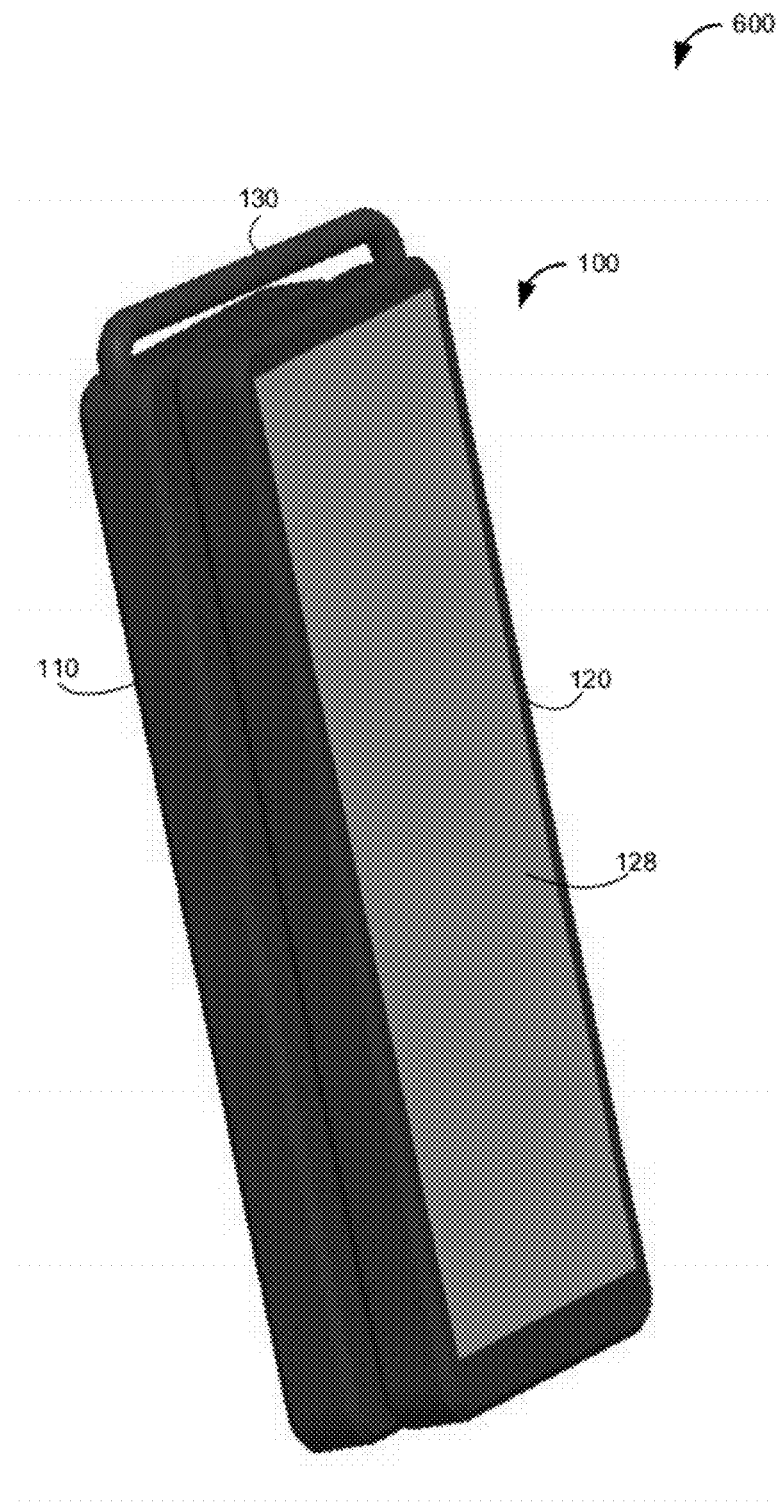
FIG. 6 is an example illustration of the apparatus in FIG. 1 in a fifth orientation according to one embodiment.

FIG. 6 is an example illustration of the apparatus 100 in FIG. 1 in a fifth orientation 600 according to one embodiment. The apparatus 100 can include the first shaft 130, the first portable communication device 110, and the second portable communication device 120. The first portable communication device 110 can include a first display (not shown) and the second portable communication device 120 can include a second display 128. The third orientation 600 can provide a back-to-back scheme for the portable communication devices 110 and 120 where the displays may face each other or may face away from each other.

Figure 7:
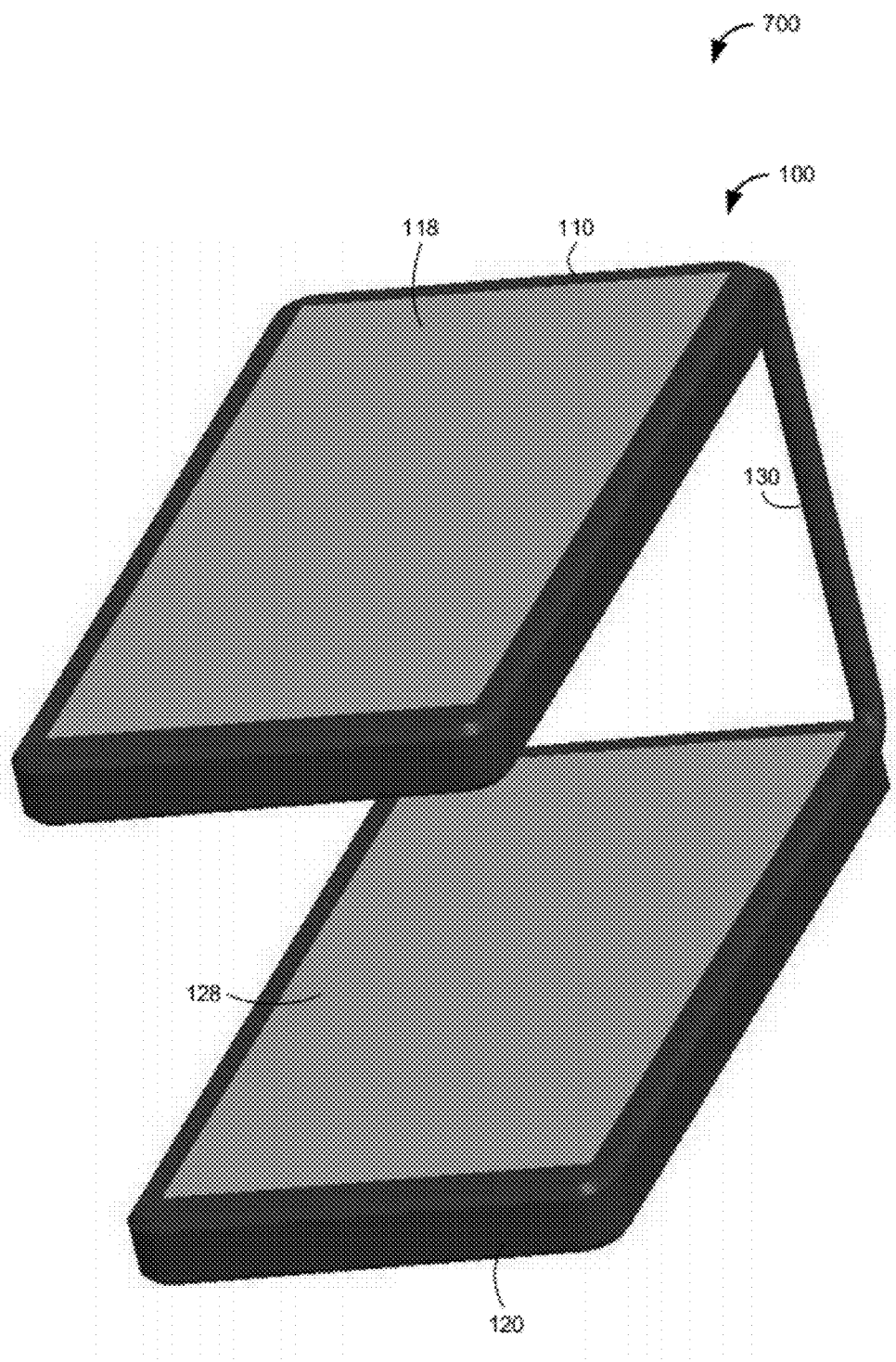
FIG. 7 is an example illustration of the apparatus in FIG. 1 in a sixth orientation according to one embodiment.

FIG. 7 is an example illustration of the apparatus 100 in FIG. 1 in a sixth orientation 700 according to one embodiment. The apparatus 100 can include the first shaft 130, the first portable communication device 110, and the second portable communication device 120. The first portable communication device 110 can include a first display 118 and the second portable communication device 120 can include a second display 128. The sixth orientation 700 can provide the portable communication devices 110 and 120 spaced apart. This can provide for projector applications, magnifying applications, see-through from one device to the other applications, or other applications.

Figure 8:
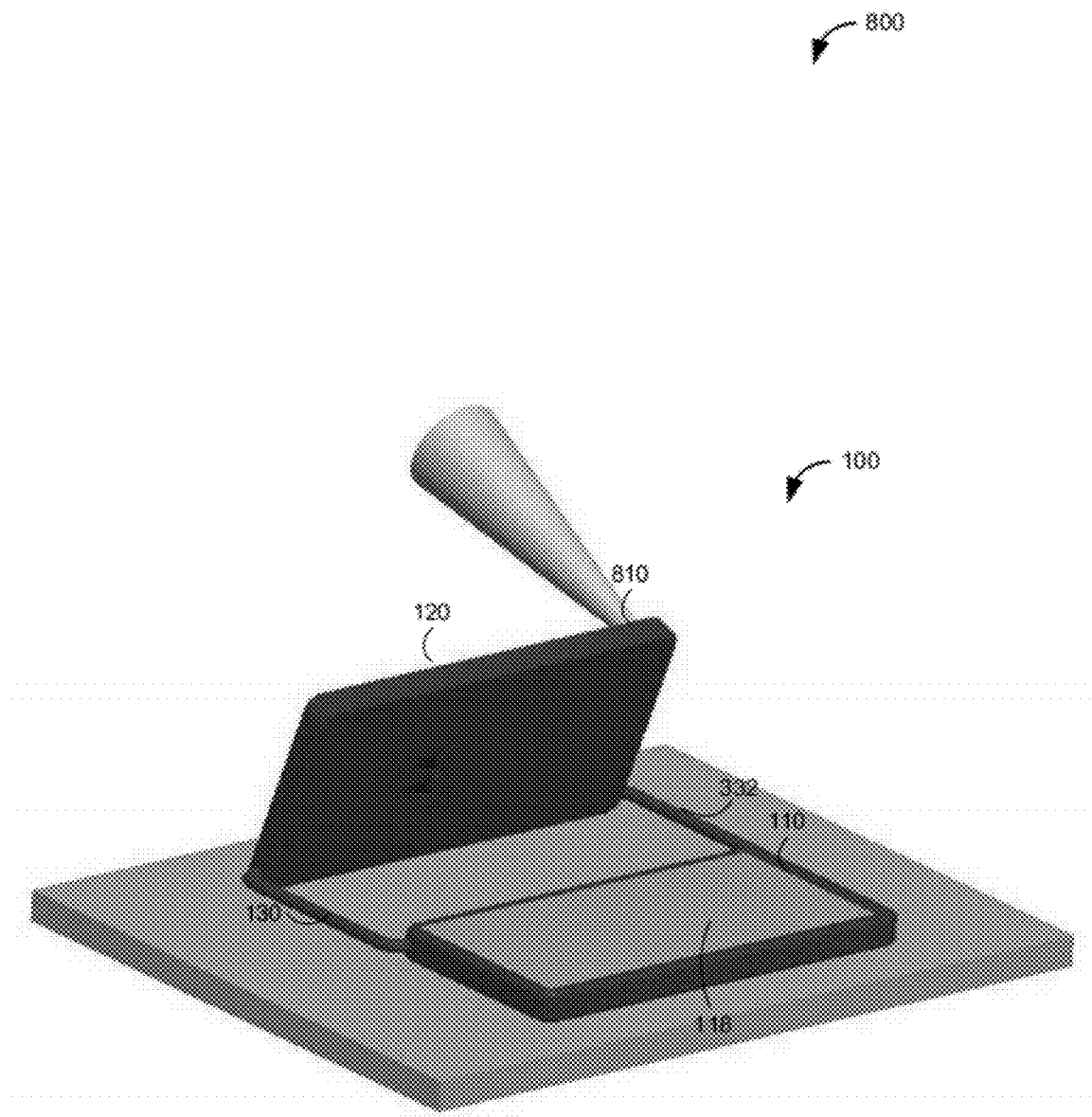
FIG. 8 is an example illustration of the apparatus in FIG. 1 in a seventh orientation according to one embodiment.

FIG. 8 is an example illustration of the apparatus 100 in FIG. 1 in a seventh orientation 800 according to one embodiment. The apparatus 100 can include the first shaft 130, the second shaft 332, the first portable communication device 110, and the second portable communication device 120. The first portable communication device 110 can include a first display 118. The second portable communication device 120 can include a projector 810. The seventh orientation 800 can provide for projecting images on a surface using the projector 810. For example, the projector 810 can project a display onto a wall or a screen. A touch screen display, such as the display 118, can be used to control the portable communication devices 110 and 120 and the projector 810.

Figure 9:
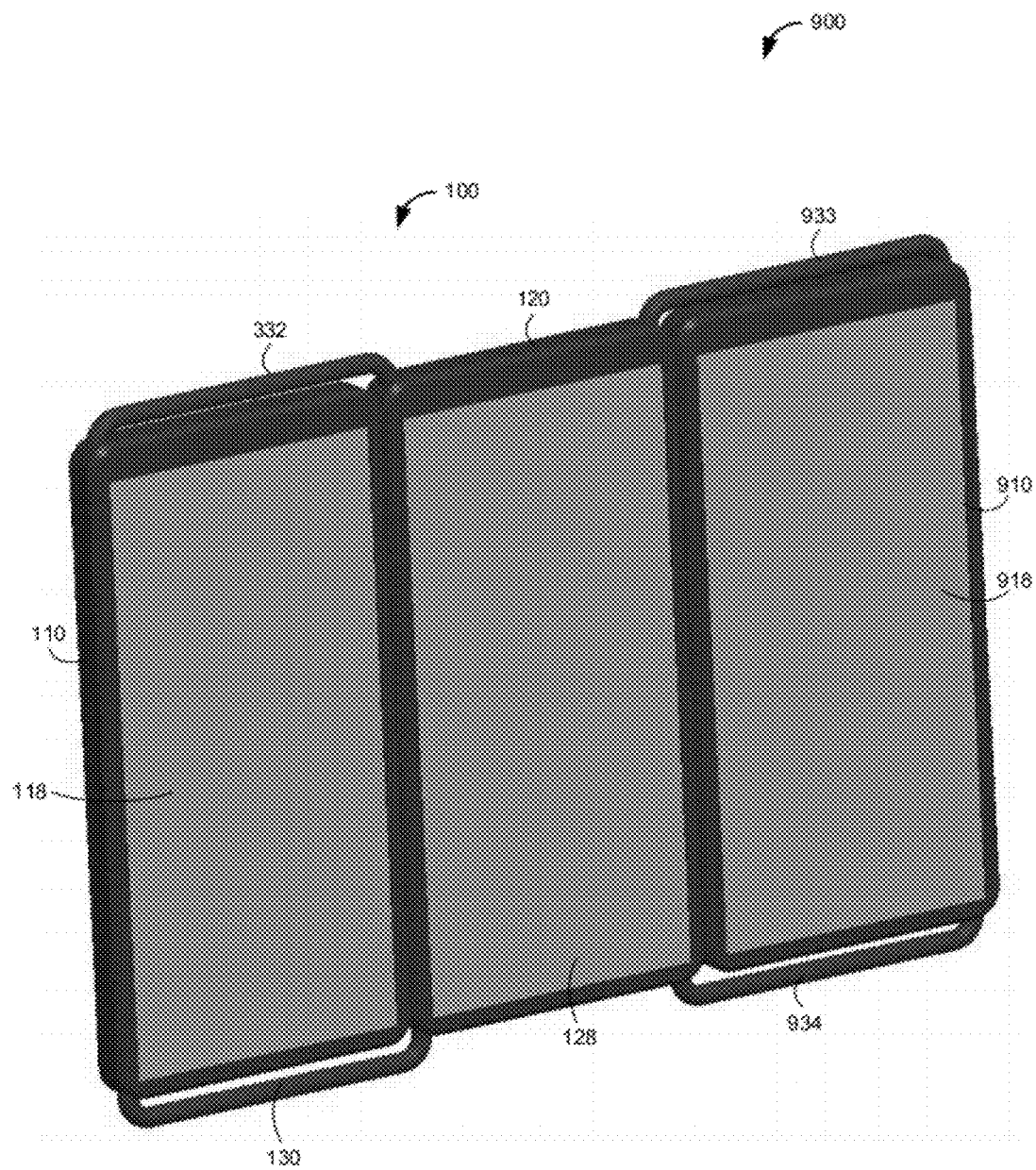
FIG. 9 is an example illustration of the apparatus in FIG. 1 in an eighth orientation according to one embodiment.

FIG. 9 is an example illustration of the apparatus 100 in FIG. 1 in an eighth orientation 900 according to one embodiment. The apparatus 100 can include the first shaft 130, the first portable communication device 110, and the second portable communication device 120. The first portable communication device 110 can include a first display 118 and the second portable communication device 120 can include a second display 128. The apparatus 100 can also include a second shaft 332, a third shaft 933, a fourth shaft 934, and a third portable communication device 910. The third portable communication device 910 can include a third display 918. Elements of the apparatus 100 in the eighth orientation 900 can operate similar to similar elements in previous embodiments. The eighth orientation 900 can provide for cascaded or tiled displays to create a larger overall screen or additional screens.

Figure 10:
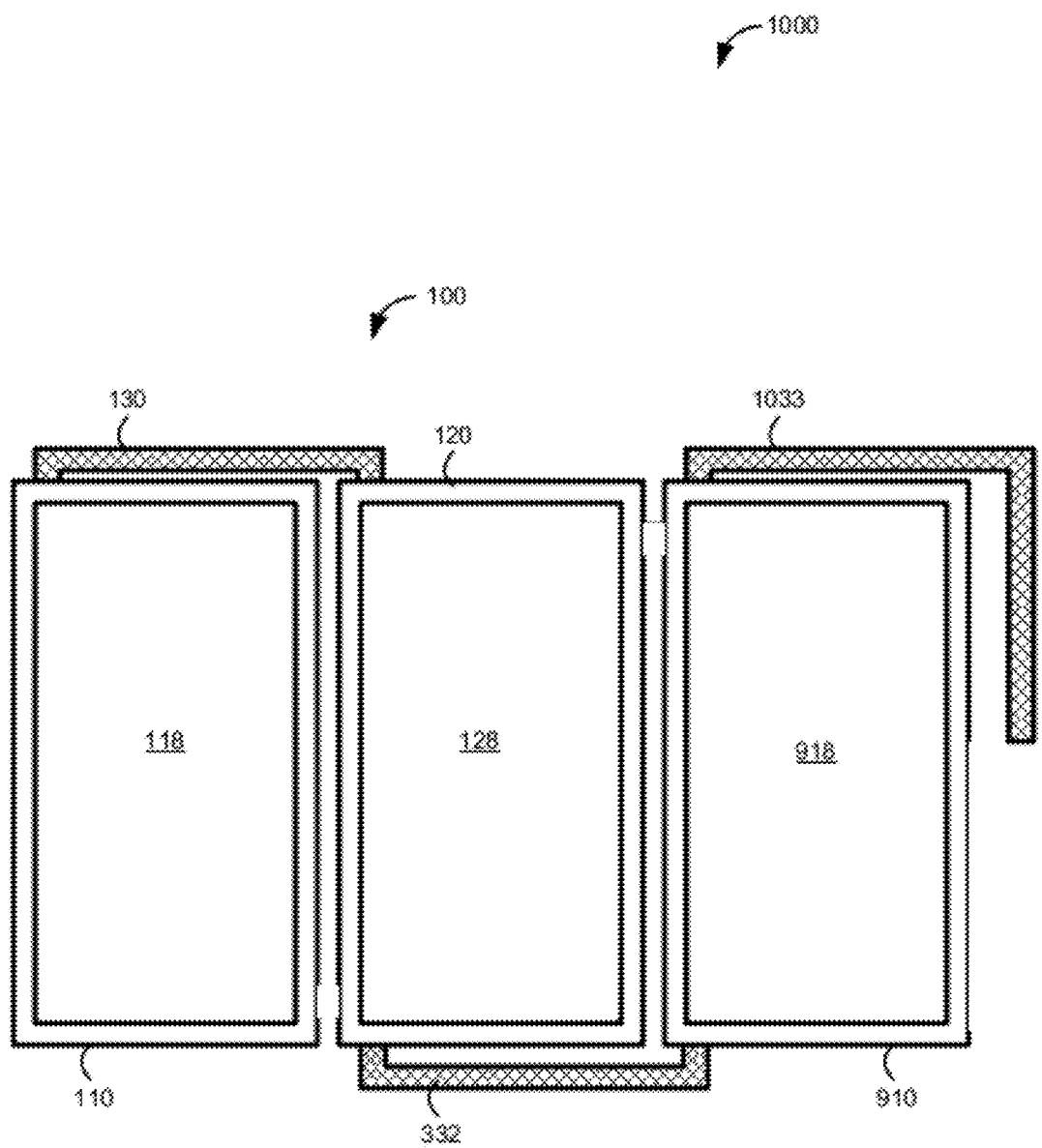
FIG. 10 is an example illustration of the apparatus in FIG. 1 in a ninth orientation according to one embodiment.

FIG. 10 is an example illustration of the apparatus 100 in FIG. 1 in a ninth orientation 1000 according to one embodiment. The apparatus 100 can include the first shaft 130, the first portable communication device 110, the second portable communication device 120, and the second shaft 332. The first portable communication device 110 can include a first display 118 and the second portable communication device 120 can include a second display 128. The apparatus 100 can also include a third shaft 1033, and the third portable communication device 910. The third portable communication device 910 can include a third display 918. Elements of the apparatus 100 in the ninth orientation 1000 can operate similar to similar elements in previous embodiments. The ninth orientation 1000 can provide for cascaded or tiled displays to create a larger overall screen or additional screens. The ninth orientation 1000 can also provide for daisy chaining even more portable communication devices by using additional shafts, such as the third shaft 1033.

Figure 11:
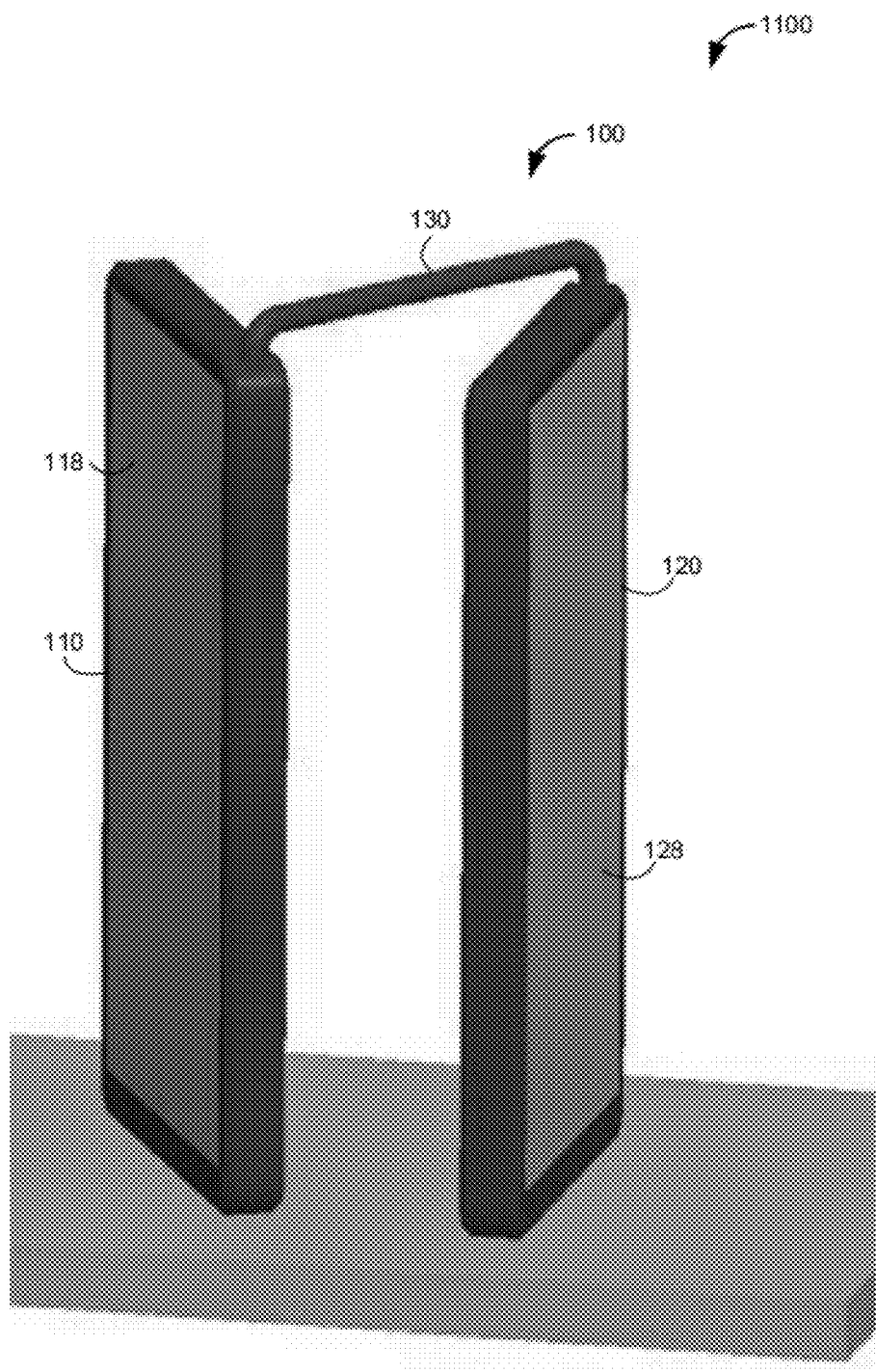
FIG. 11 is an example illustration of the apparatus in FIG. 1 in a tenth orientation according to one embodiment.

FIG. 11 is an example illustration of the apparatus 100 in FIG. 1 in a tenth orientation 1100 according to one embodiment. The apparatus 100 can include the first shaft 130, the first portable communication device 110, and the second portable communication device 120. The first portable communication device 110 can include a first display 118 and the second portable communication device 120 can include a second display 128. The tenth orientation 1100 can provide an angled viewing mode for the apparatus 100. For example, the tenth orientation 1100 can provide for sharing similar or different displays 118 and 128 for two or more users.

Figure 12:
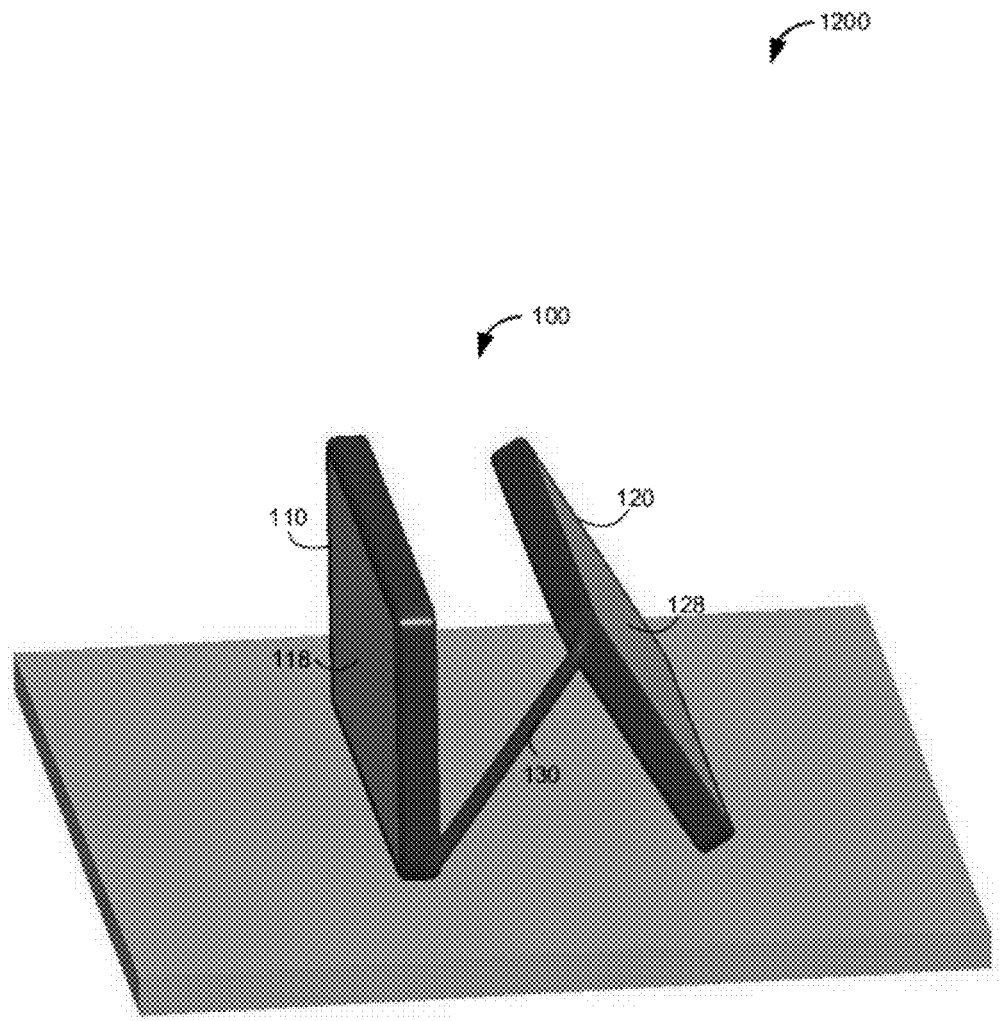
FIG. 12 is an example illustration of the apparatus in FIG. 1 in an eleventh orientation according to one embodiment.

FIG. 12 is an example illustration of the apparatus 100 in FIG. 1 in an eleventh orientation 1200 according to one embodiment. The apparatus 100 can include the first shaft 130, the first portable communication device 110, and the second portable communication device 120. The first portable communication device 110 can include a first display 118 and the second portable communication device 120 can include a second display 128. The eleventh orientation 1200 can provide an angled viewing mode for the apparatus 100. For example, the eleventh orientation 1200 can provide for sharing similar or different displays 118 and 128 for two or more users.

Figure 13:
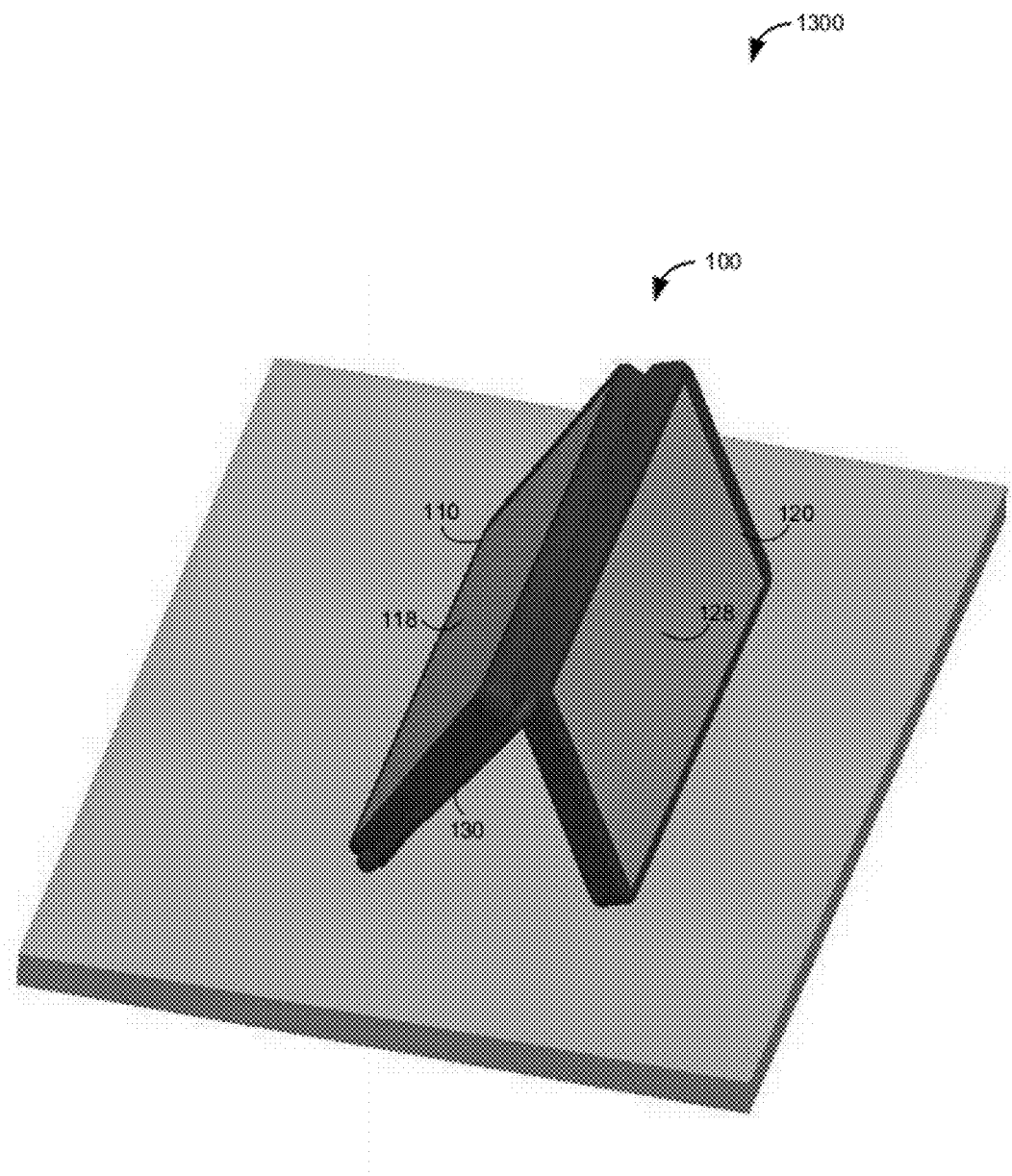
FIG. 13 is an example illustration of the apparatus in FIG. 1 in a twelfth orientation according to one embodiment.

FIG. 13 is an example illustration of the apparatus 100 in FIG. 1 in a twelfth orientation 1300 according to one embodiment. The apparatus 100 can include the first shaft 130, the first portable communication device 110, and the second portable communication device 120. The first portable communication device 110 can include a first display 118 and the second portable communication device 120 can include a second display 128. The twelfth orientation 1300 can provide a conference phone viewing mode for the apparatus 100.

Figure 14:
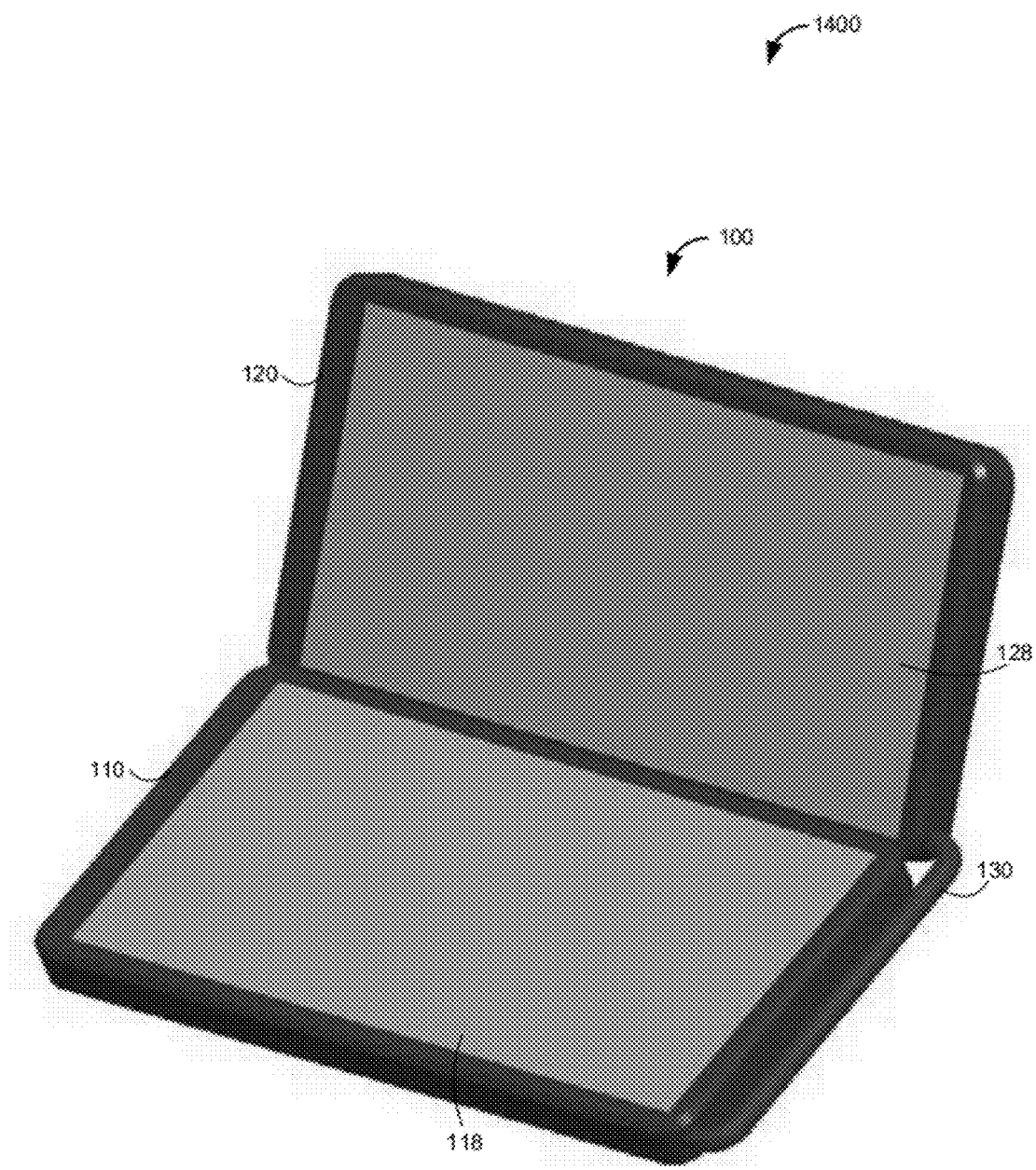
FIG. 14 is an example illustration of the apparatus in FIG. 1 in a thirteenth orientation according to one embodiment.

FIG. 14 is an example illustration of the apparatus 100 in FIG. 1 in a thirteenth orientation 1400 according to one embodiment. The apparatus 100 can include the first shaft 130, the first portable communication device 110, and the second portable communication device 120. The first portable communication device 110 can include a first display 118 and the second portable communication device 120 can include a second display 128. The apparatus 100 can flip from the third orientation 400 to the thirteenth orientation 1400. Thus, a user can set the apparatus 100 in the third orientation 400 for work phone usage and can set the phone in the thirteenth orientation 1400 for home phone usage. For example, the third orientation 400 can provide work phone settings and the thirteenth orientation 1400 can provide home phone settings. The apparatus 100 can also be flipped between orientations to switch settings for other functionalities without requiring a user to touch a touchscreen or push a button. This can change the apparatus 100 form factor and experience.

Figure 15:
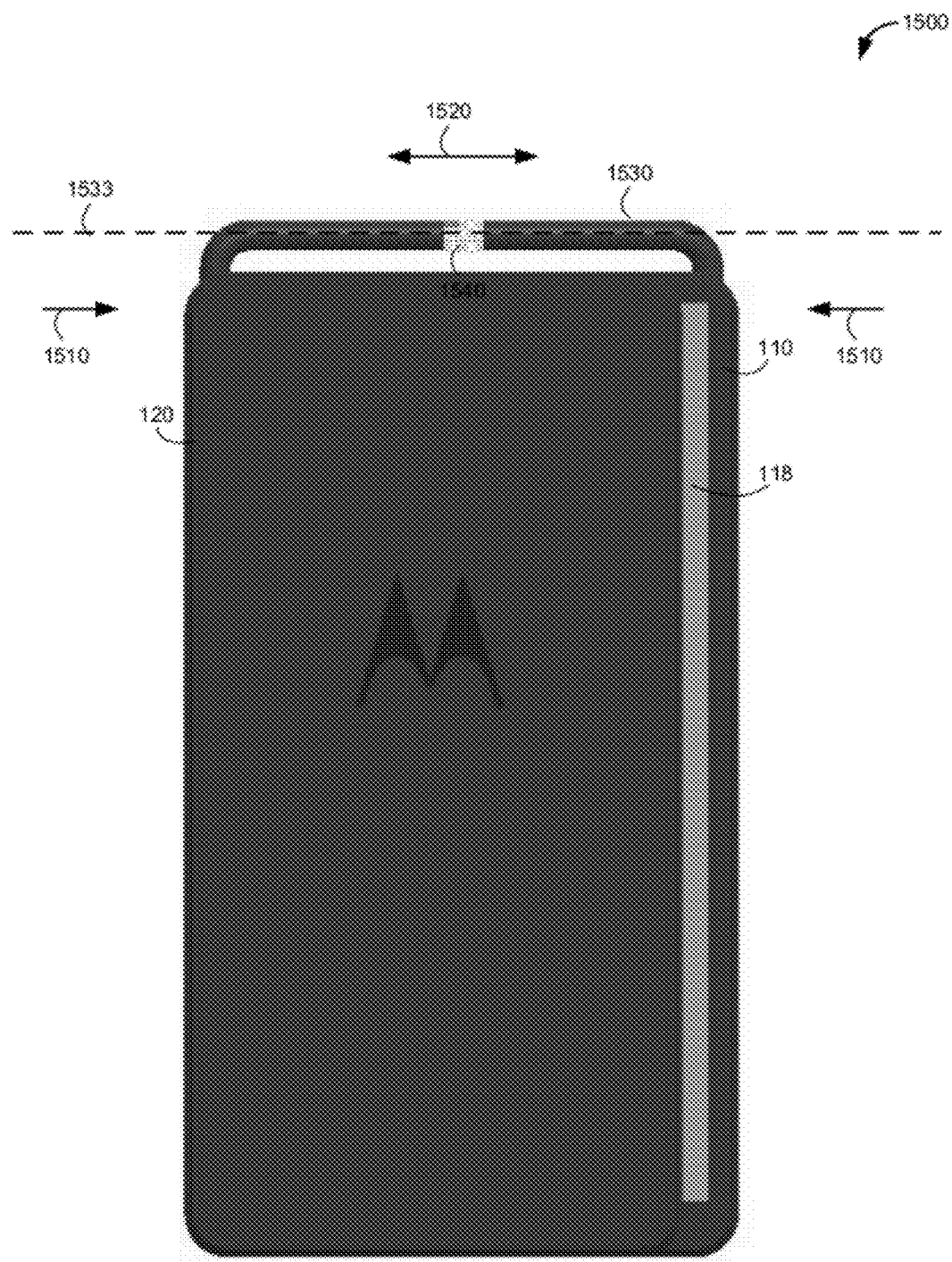
FIG. 15 is an example illustration of an apparatus according to one embodiment.

FIG. 15 is an example illustration of an apparatus 1500, such as the apparatus 100, according to one embodiment. The apparatus 1500 can include a first shaft 1530, the first portable communication device 110, and the second portable communication device 120. The first portable communication device 110 can include the first display 118. The first shaft 1530 can be manually compressible 1510 and decompressible 1520 along the first shaft longitudinal axis 1533. For example, the first shaft 1530 can include a spring or other compressible material 1540. When a user squeezes 1510 the apparatus 1500, the compressible material 1540 can compress. When the user stops squeezing the apparatus 1500, the compressible material 1540 can expand back to its previous state.

For example, an exposed portion of the first display 118 can display a caller identifier when there is an incoming call. A user can look at the first display 118 to identify the caller. If the user wishes to answer the call, the user can squeeze 1510 the apparatus 1500 to answer the call. The exposed portion of the first display 118 can also display other information and a user can squeeze 1510 the apparatus 1500 to activate other functions of the apparatus. For example, the exposed portion of the first display 118 can display a song currently being played when the apparatus 1500 is being used as a music player. A user can then squeeze 1510 the apparatus 1500 to pause the song. A user can also squeeze 1510 the apparatus 1500 and the first shaft 1530 can lock into a closed position that hides the exposed portion of the first display 118 to allow the user to transport the apparatus 1500. The user can then squeeze 1510 the apparatus 1500 to unlock or decompress 1520 the first shaft 1530 to use the apparatus 1500.

Figure 16:
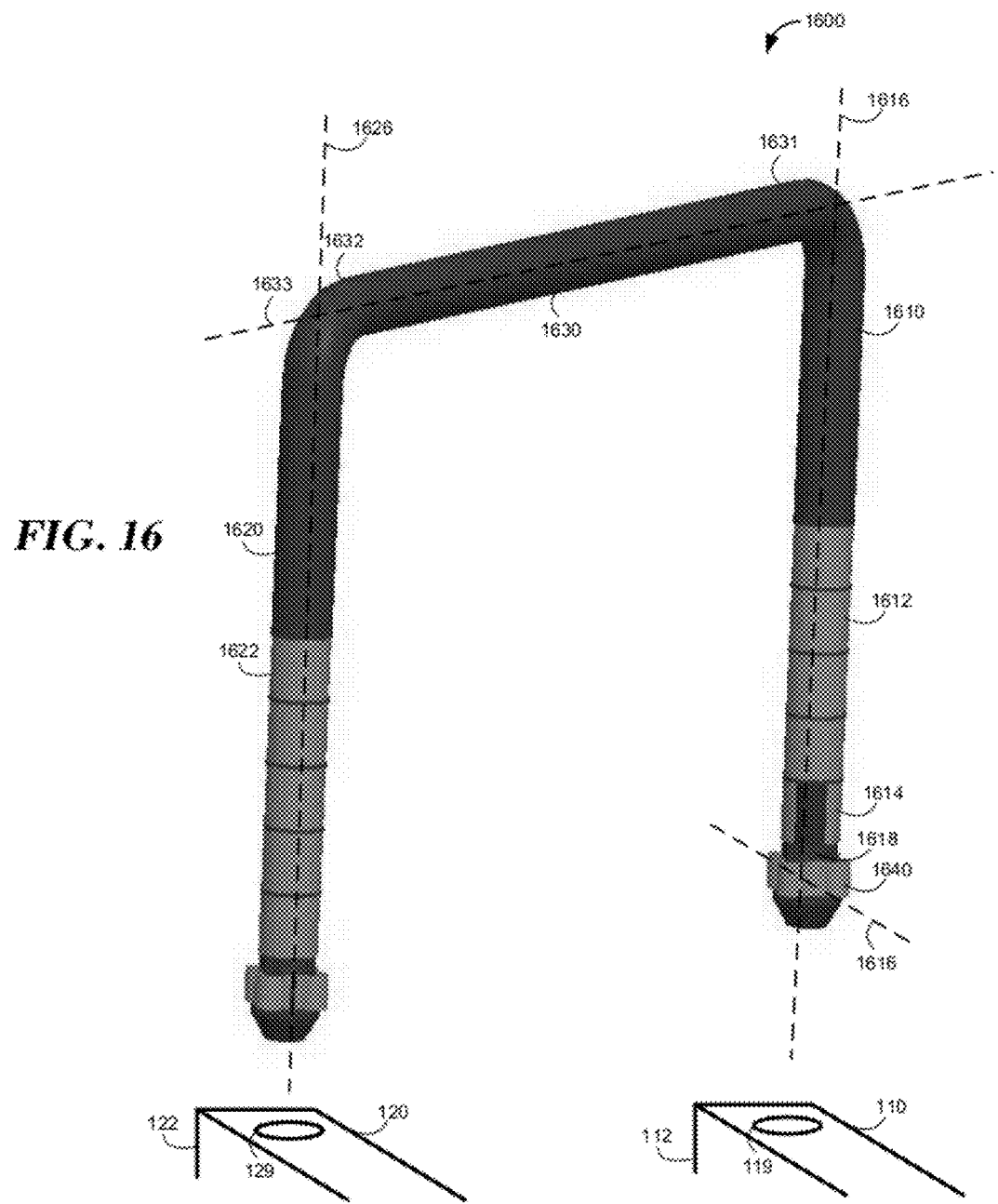
FIG. 16 is an example illustration of an apparatus according to one embodiment.

FIG. 16 is an example illustration of an apparatus 1600, such as a portion of the apparatus 100, according to one embodiment. The apparatus 1600 can include a first shaft 1630. The apparatus 1600 can include a first shaft leg 1610 coupled to the first shaft 1630 at a first shaft end 1631. The first shaft leg 1610 can be substantially perpendicular to a first shaft longitudinal axis 1633. For example, a first shaft leg longitudinal axis 1616 can be substantially perpendicular to the first shaft longitudinal axis 1633. The first shaft leg 1610 can be detachably coupled to a first portable communication device 110.

The apparatus 1600 can include a second shaft leg 1620 coupled to the first shaft 1630 at a second shaft end 1632. The second shaft leg 1620 can be substantially perpendicular to the first shaft longitudinal axis 1633. For example, a second shaft leg longitudinal axis 1626 can be substantially perpendicular to the first shaft longitudinal axis 1633. The second shaft leg 1620 can be coupled to the second portable communication device 120. The first shaft 1630, the first shaft leg 1610, and the second shaft leg 1620 can collectively be a U-shaped shaft connector. The U-shaped shaft connector can be used in all of the embodiments.

The first shaft leg 1610 can include a first shaft leg communication signal interface 1612 configured to exchange electrical communication signals with a first portable communication device communication signal interface (not shown). For example, electrical communication signals can include power for devices, charging for devices, data communication between devices, and part identification of devices. Part identification can indicate a type of device connected. The second shaft leg 1620 can include a second shaft leg communication signal interface 1622 configured to exchange electrical communication signals with the second portable communication device communication signal interface (not shown). The first shaft leg communication signal interface 1612 can be coupled to the second shaft leg communication interface 1622 to transmit electrical communication signals between the first shaft leg communication signal interface 1612 and the second shaft leg communication signal interface 1622. For example, the first shaft leg communication signal interface 1612 can transmit electrical communication signals to and from the second shaft leg communication signal interface 1622 using wires, a communication bus, an electrical flex circuit, a micro coaxial circuit, or any other way of communicating electrical communication signals. Communication signals can be transmitted between the shaft leg communication signal interfaces 1612 and 1622 through the first shaft 1630. The first shaft leg communication signal interface 1612 can also transmit optical communication signals to and from the second shaft leg communication signal interface 1622. The first shaft leg communication signal interface 1612 can include at least one encoder ring 1614 that only partially circles the first shaft leg longitudinal axis 1616. The encoder ring 1614 can enable communications and disable communications between the first portable communication device 110 and the second portable communication device 120 depending on the orientation of the first portable communication device 110 relative to the first shaft leg 1610. The apparatus 1600 can also include additional full encoder rings and additional encoder rings that partially circle the first shaft leg 1610 and/or the second shaft leg 1620.

The first shaft leg 1610 can include at least one flat surface 1618 perpendicular to a 1616 line perpendicular to the first shaft leg longitudinal axis 1616. The at least one flat surface 1618 can operate as a camming mechanism to hold one housing 112 relative to another housing 122 in different positions.

Friction may also be used to hold one housing 112 relative to another housing 122 in different positions. The at least one flat surface 1618 can temporarily set a first housing 112 of the first portable communication device 110 in one position as the first housing 112 rotates about the first shaft leg longitudinal axis 1616. For example, a U-shaped hinge and the first housing 112 can use a spring loaded structure for rotation setting. The second shaft leg 1620 may include elements of the first shaft leg 1610. The first housing 112 of the first portable communication device 110 can include a first aperture 119 configured to receive the first shaft leg 1610. A second housing 122 of the second portable communication device 120 can include a second aperture 129 configured to receive the second shaft leg 1620. The apertures 119 and/or 129 can also be used to charge the portable communication devices 110 and/or 120.

For example, the apparatus 1600 can include ring contacts 1612 and spring loaded structures, such as a spring loaded structure 1640, for rotation setting. To elaborate, the spring loaded structure 1640 can be part of the first housing 112 and can mate with the first shaft leg 1610. The spring loaded structure 1640 can nest in the first housing 112 and can operate in conjunction with the at least one flat surface 1618 to set the first housing 112 in at least one position when the first housing 112 rotates about the first shaft leg 1610. Also, when the first shaft leg 1610 is inserted into the first aperture 119, it can slide into the spring loaded structure 1640 and can detachably lock the first shaft leg 1610 into the first housing 112. While the spring loaded structure 1640 is shown outside of the first housing 112 for illustration purposes, it is typically part of the first housing 112.

The shaft 1630 and shaft legs 1610 and/or 1620 may be one continuous structure or the shaft legs 1610 and/or 1620 can be made separately and can be coupled to the shaft ends 1631 and/or 1632. Also, the first shaft leg 1610 can be parallel with the second shaft leg 1620 and can extend in the same direction from the shaft 1630 as the second shaft leg 1620.

Embodiments can provide for a double-ended clip hinge, such as the U-shaped shaft connector, that inserts into and couples phone halves mechanically and electrically. The U-shaped shaft connector can be a U-shaped piece or U-pin including the shaft 1630, such as shaft 130. The U-shaped shaft connector can be a mechanical piece that inserts into phone halves, such as two mobile phones or two other electronic devices, and rotates relative to a phone side it is inserted into. Communication between the two halves can be wireless. In another embodiment, the clip ends can incorporate contact rings, such as the rings 1612 and 1622, similar to headset jacks, which can maintain electrical connection at any angle of rotation. Angular encoding where phone halves perform different function based on rotation topology can be enabled using partial rings.

A U-shaped shaft connector can be removable, just like a headset jack, which can allow for insertion of different phone halves or cards, thus enabling functionality beyond single phones or cards. A detachable U-shaped shaft connector, such as a U-shaped hinge, can allow a user to carry only one of the phone halves if desired. In this case, the U-shaped shaft connector compartment, such as the aperture 119, can be left open or covered by a plug when carrying only one half of the phone. During this operation, the compartment in the phone half can be used to nest other detachable pieces, such as memory sticks with headset connectors, cameras with headset connectors, or other detachable pieces that can be used with the compartment. In addition to the headset type connector, the pin can mate with spring loaded teeth scheme, which can be part of the phone housing. This can allow for placement of the halves at any discrete angles relative to one another. For example, during rotation of the halves around the U-shaped hinge, the halves can snap into place every few degrees. The design can also allow for continuous and infinite rotation to prevent breaking the U-shaped hinge during rotation. For example, the halves may just use spring loaded resting positions without embedded stops.

The U-shaped hinge scheme can enable numerous phone configurations. For example, the configurations can include side by side, top over bottom, back to back, TV mode, elevated TV mode, a slider where the u-pin slides into a sliding slot inside a half housing at the right angle, or other modes.

Figure 17:
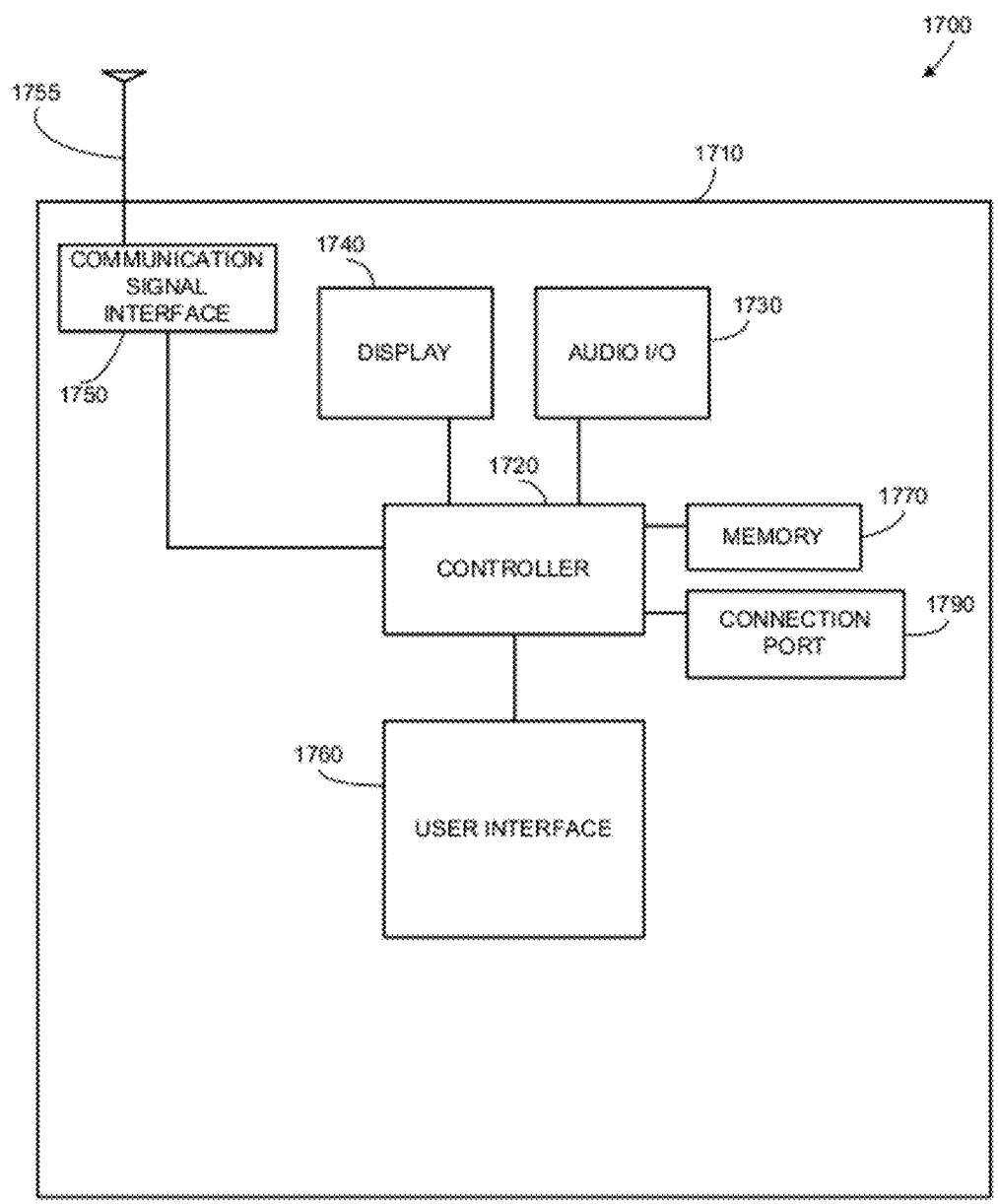
FIG. 17 is an exemplary block diagram of a wireless communication device according to one embodiment.

FIG. 17 is an exemplary block diagram of a wireless communication device 1700, such as the first portable communication device 110 and/or the second portable communication device 120, according to a possible embodiment. The wireless communication device 1700 can include a housing 1710, a controller 1720 located within the housing 1710, audio input and output circuitry 1730 coupled to the controller 1720, a display 1740 coupled to the controller 1720, a communication signal interface 1750 coupled to the controller 1720, an antenna 1755 coupled to the communication signal interface 1750, a user interface 1760 coupled to the controller 1720, and a memory 1770 coupled to the controller 1720. The wireless communication device 1700 can also include a connection port 1790. The connection port 1790 can connect the wireless communication device 1700 with a shaft leg, such as with the first shaft leg 1610 or with the second shaft leg 1620, or as otherwise shown in other embodiments. The connection port may include the communication signal interface 1750 or may include an additional communication signal interface.

The display 1740 can be a liquid crystal display (LCD), a light emitting diode (LED) display, a plasma display, a touch screen display, a projector, or any other means for displaying information. Other methods can be used to present information to a user, such as aurally through a speaker or kinesthetically through a vibrator. The audio input and output circuitry 1730 can include a microphone, a speaker, a transducer, or any other audio input and output circuitry. The user interface 1760 can include a keypad, buttons, a touch pad, a joystick, an additional display, a touch screen display, or any other device useful for providing an interface between a user and an electronic device. The memory 1770 can include a random access memory, a read only memory, an optical memory, a subscriber identity module memory, a removable memory, or any other memory that can be coupled to a wireless communication device.

The communication signal interface 1750 may include a transmitter and/or a receiver. The communication signal interface 1750 can communicate with communication signal interfaces of other wireless communication devices. For example, the communication signal interface 1750 can communicate with another wireless communication device communication signal interface using the first shaft leg communication signal interface 1612. The communication signal interface 1750 can transmit electrical communication signals between the first shaft leg communication signal interface 1612 and the second shaft leg communication signal interface 1622 to communicate with a communication signal interface of another wireless communication device.

The communication signal interface 1750 can also communicate wirelessly with another portable communication device signal interface, such as by using a short range wireless direct communication protocol, such as Bluetooth or 802.11, for directly communicating between the interfaces, by using a short range wireless communication protocol, such as a wireless local area network, for indirectly communicating between the interfaces, by using a long range wireless communication protocol, such as a cellular network, for communicating between the interfaces, or by using any other wireless communication protocol.

Embodiments can provide for a detachable/rotatable hinge clip allowing for fully configurable phone formfactors. Embodiments can provide a very simple, easy, effortless, and interesting scheme to configure a phone for the best experience based on the chosen use mode. The scheme can allow for functionality expansion by detaching and allowing other features to be added in a straightforward manner. Embodiments can provide for an attachable and removable U-shaped clip. The clip can be purely mechanical, or can conduct power and data between phone halves via headset jack-type rings or optical coupling. The clip can allow for multiple configurations of phone halves, such as including various side by side, back to front, top over bottom, Clam, low TV, and elevated TV modes with the simple action of rotation enabled by a U-shaped PIN.

Embodiments can provide for a removable dual-ended U-Shaped headset-type jack interface with encoded rings used for electrical interface. Embodiments can provide for a removable dual-ended U-shaped headset-type jack interface with encoded rings used for electrical interface and spring loaded teeth interface enabling stops at any angle. Embodiments can provide for a removable dual-ended U-shaped headset-type jack interface with encoded rings used for electrical interface and spring loaded teeth interface enabling infinite rotation. Embodiments can provide for a removable and insertable dual-ended U-shaped mechanical interface enabling rotation. Embodiments can provide for a removable and insertable dual-ended U-shaped mechanical interface triggering wireless communication by lack of electrical contact or bay insert activated electrical contact. Embodiments can provide for a compartment in each phone half used for receiving a detachable device, such as a headset jack type connector attached to thumb stick or to a camera, or other detachable devices.

Embodiments can provide for a dual-ended hinge scheme allowing for display doubling, such as a side-by-side display. Embodiments can provide for a dual-ended hinge scheme allowing for back to back displays facing in opposite directions. Embodiments can provide for a dual-ended hinge scheme allowing for clam operation. Embodiments can provide for a dual-ended hinge scheme allowing for a TV low level TV viewing mode. Embodiments can provide for a dual-ended hinge scheme allowing for an elevated TV viewing mode. Embodiments can provide for a dual-ended hinge scheme allowing for placing phone halves parallel and spaced apart, such as for magnifying/projecting functionality. Embodiments can provide for a clip that can slide inside the halves that uses rotation to create a slider experience. Embodiments can provide for a dual-ended hinge scheme allowing for all above, but with the halves reversed or in any combination. For example, examples may not only arrange which side one half is placed relative to the other, but also which front/back orientation each half has. Embodiments can provide for a hinge scheme that allows for the cascading of more than two screens for larger screen forming and viewing. Embodiments can provide for a narrow Caller Line Identification (CLI) strip, such as a caller identifier (caller ID) strip, when part of large display is visible for CLI functionality in a flip or slider closed mode. Embodiments can provide for a different hinge type/form factor that can be head wearable, which can allow for the connecting of two phone sides to fit the head as a stereo headset. Embodiments can provide for switching an orientation of connected halves in a TV/Clam mode to switch between two phone environments, such as work and home environments, by automatically adjusting content type, appearance, functionality etc without altering the form factor or activating a touch screen.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
   a first shaft having a first shaft longitudinal axis, a first shaft length along the first shaft longitudinal axis, a first shaft end at a first end along the first shaft longitudinal axis, and a second shaft end at a second end along the first shaft longitudinal axis, the second shaft end opposite the first shaft end;
   a first portable communication device including:
   a first portable communication device communication signal interface; and a first housing coupled to the first shaft end where the first housing rotates about an axis perpendicular to the first shaft longitudinal axis, the first housing having a first housing length perpendicular to the first shaft longitudinal axis, a first housing width perpendicular to the first housing length, and a first housing height perpendicular to the first housing width and the first housing length, where the first housing width is greater than the first housing height; and
   a second portable communication device including:
   a second portable communication device communication signal interface configured to communicate with the first portable communication device communication signal interface; and
   a second housing coupled to the second shaft end, where the second housing rotates about an axis perpendicular to the first shaft longitudinal axis,
   wherein the first shaft length is at least as long as the first housing width, and
   wherein the first portable communication device is adapted to be used independent from the second portable communication device.

2. The apparatus according to claim 1, wherein the first housing rotates with respect to the first shaft about an axis parallel with the first housing length.

3. The apparatus according to claim 1, wherein the second housing has a second housing length that is substantially equal to the first housing length.

4. The apparatus according to claim 1,
   wherein the second portable communication device housing has a second housing length perpendicular to the first shaft longitudinal axis, a second housing width perpendicular to the second housing length, and a second housing height perpendicular to the second housing width and the second housing length, where the second housing width is greater than the second housing height, and
   wherein the first shaft length is at least as long as the second housing width.

5. The apparatus according to claim 1,
   wherein the first shaft includes:
   a first shaft leg coupled to the first shaft at the first shaft end, the first shaft leg substantially perpendicular to the first shaft longitudinal axis, the first shaft leg coupled to the first portable communication device; and
   a second shaft leg coupled to the first shaft at the second shaft end, the second shaft leg substantially perpendicular to the first shaft longitudinal axis, the second shaft leg coupled to the second portable communication device.

6. The apparatus according to claim 5,
   wherein the first shaft leg includes a first shaft leg communication signal interface configured to exchange electrical communication signals with the first portable communication device communication signal interface,
   wherein the second shaft leg includes a second shaft leg communication signal interface configured to exchange electrical communication signals with the second portable communication device communication signal interface, and
   wherein where the first shaft leg communication signal interface is coupled to the second shaft leg communication interface to transmit electrical communication signals between the first shaft leg communication signal interface and the second shaft leg communication signal interface.

7. The apparatus according to claim 6,
wherein the first shaft leg has a first shaft leg longitudinal axis, and
wherein the first shaft leg communication signal interface comprises at least one encoder ring that only partially circles the first shaft leg longitudinal axis.

8. The apparatus according to claim 5,
wherein the first shaft leg has a first shaft leg longitudinal axis, and
wherein the first shaft leg includes at least one flat surface perpendicular to a line perpendicular to the first shaft leg longitudinal axis, the at least one flat surface configured to temporarily set the first housing in one position as the first housing rotates about the first shaft leg longitudinal axis.

9. The apparatus according to claim 5,
wherein the first housing includes a first aperture configured to receive the first shaft leg; and
wherein the second housing includes a second aperture configured to receive the second shaft leg.

10. The apparatus according to claim 5, wherein the first shaft, the first shaft leg, and the second shaft leg comprise a U-shaped shaft connector.

11. The apparatus according to claim 1, wherein the first shaft is manually compressible along the first shaft longitudinal axis.

12. The apparatus according to claim 1, wherein the first housing is detachably coupled to the first shaft end such that the first housing is intended to be separated from the first shaft end.

13. The apparatus according to claim 1, further comprising a second shaft having a second shaft longitudinal axis parallel to the first shaft longitudinal axis, the second shaft coupled to the first housing and coupled to the second housing.

14. The apparatus according to claim 1, wherein the first housing is configured to infinitely rotate about an axis perpendicular to the first shaft longitudinal axis.

15. The apparatus according to claim 1,
wherein first shaft, the first housing, and the second housing, when connected together, operate to provide at least two of:
a side-by-side display for the two housings,
an elevated display with respect to one housing,
a back-to-back setting with displays opposite from each other for each housing,
a front-to-front setting with displays facing each other for each housing,
more than two cascaded displays for more than two housings,
angled displays facing away from each other for each housing, and a front-to-front setting with displays facing each other for each housing with at least one display partially exposed.

16. The apparatus according to claim 1,
wherein the first housing includes a first housing display,
wherein the second housing includes a second housing display, and
wherein first shaft, the first housing, and the second housing, when connected together via the first shaft, provide a front-to-front setting with the first housing display facing the second housing display with at least one portion of one of the displays covered and second portion of the one of the displays exposed.

17. The apparatus according to claim 16, wherein the first shaft is manually compressible and decompressible along the first shaft longitudinal axis to hide and expose the second portion of the one of the displays.

18. The apparatus according to claim 16, wherein the second portion of the one of the displays is configured to display a caller identifier when exposed.

19. The apparatus according to claim 1, wherein the first portable communication device communication signal interface is configured to communicate with the second portable communication device communication signal interface using optical communication signals through the first shaft.

20. The apparatus according to claim 1,
wherein the first shaft end includes a plurality of contact rings, and
wherein the first housing includes an aperture detachably coupled to the first shaft end and the first portable communication device signal interface couples to the plurality of contact rings when the first housing is coupled to the first shaft end.

21. An apparatus comprising:
a first shaft having:
a first shaft longitudinal axis;
a first shaft length along the first shaft longitudinal axis;
a first shaft end at a first end along the first shaft longitudinal axis;
a first shaft leg coupled to the first shaft at the first shaft end of the first shaft length, the first shaft leg having a first shaft leg longitudinal axis substantially perpendicular to the first shaft longitudinal axis;
a second shaft end at a second end of the first shaft length along the first shaft longitudinal axis, the second shaft end opposite the first shaft end; and
a second shaft leg coupled to the first shaft at the second shaft end, the second shaft leg having a second shaft leg longitudinal axis substantially parallel to the first shaft leg longitudinal axis;
a first portable communication device including:
a first portable communication device communication signal interface; and
a first housing detachably coupled to the first shaft leg where the first housing rotates about an axis parallel to the first shaft leg longitudinal axis, the first housing having a first housing length perpendicular to the first shaft longitudinal axis, a first housing width perpendicular to the first housing length, and a first housing height perpendicular to the first housing width and the first housing length, where the first housing width is greater than the first housing height; and
a second portable communication device including:
a second portable communication device communication signal interface configured to communicate with the first portable communication device communication signal interface; and
a second housing detachably coupled to the second shaft leg, where the second housing rotates about an axis parallel to the first shaft leg longitudinal axis,
wherein the first shaft length is at least as long as the first housing width, and
wherein the first portable communication device is adapted to be used independent from the second portable communication device.

22. The apparatus according to claim 21,
wherein the first shaft leg includes a first shaft leg communication signal interface configured to exchange electrical communication signals with the first portable communication device communication signal interface, wherein the second shaft leg includes a second shaft leg communication signal interface configured to exchange electrical communication signals with the second portable communication device communication signal interface, and wherein where the first shaft leg communication signal interface is coupled to the second shaft leg communication interface to transmit electrical communication signals between the first shaft leg communication signal interface and the second shaft leg communication signal interface.

23. An apparatus comprising:
a first shaft having:
- a first shaft longitudinal axis;
- a first shaft length along the first shaft longitudinal axis;
- a first shaft end at a first end along the first shaft longitudinal axis;
- a first shaft leg coupled to the first shaft at the first shaft end of the first shaft length, the first shaft leg having a first shaft leg longitudinal axis substantially perpendicular to the first shaft longitudinal axis;
- a second shaft end at a second end of the first shaft length along the first shaft longitudinal axis, the second shaft end opposite the first shaft end; and
- a second shaft leg coupled to the first shaft at the second shaft end, the second shaft leg having a second shaft leg longitudinal axis substantially parallel to the first shaft leg longitudinal axis;

a first portable communication device including:
- a first portable communication device communication signal interface; and
- a first housing detachably coupled to the first shaft leg such that the first housing is intended to be separated from the first shaft leg, where the first housing rotates about an axis concentric with the first shaft leg longitudinal axis, the first housing having a first housing length perpendicular to the first shaft longitudinal axis, a first housing width perpendicular to the first housing length, and a first housing height perpendicular to the first housing width and the first housing length, where the first housing width is greater than the first housing height;

a second portable communication device including:
- a second portable communication device communication signal interface configured to communicate with the first portable communication device communication signal interface; and
- a second housing detachably coupled to the second shaft leg such that the second housing is intended to be separated from the first shaft leg, where the second housing rotates about an axis concentric with the second shaft leg longitudinal axis; and a second shaft having a second shaft longitudinal axis substantially parallel to the first shaft longitudinal axis, the second shaft coupled to the first housing and coupled to the second housing, wherein the first shaft width is at least as long as the first housing length, and wherein the first portable communication device is adapted to be used independent from the second portable communication device.

\* \* \* \* \*